(12) United States Patent
Arik et al.

(10) Patent No.: US 10,540,961 B2
(45) Date of Patent: Jan. 21, 2020

(54) CONVOLUTIONAL RECURRENT NEURAL NETWORKS FOR SMALL-FOOTPRINT KEYWORD SPOTTING

(71) Applicant: Baidu USA, LLC, Sunnyvale, CA (US)

(72) Inventors: Sercan Arik, San Francisco, CA (US); Markus Kliegl, Santa Clara, CA (US); Rewon Child, San Francisco, CA (US); Joel Hestness, Mountain View, CA (US); Andrew Gibiansky, Mountain View, CA (US); Christopher Fougner, Palo Alto, CA (US); Ryan Prenger, Oakland, CA (US); Adam Coates, Mountain View, CA (US)

(73) Assignee: Baidu USA LLC, Sunnyvale, CA (US)

(*) Notice: Subject to any disclaimer, the term of this patent is extended or adjusted under 35 U.S.C. 154(b) by 117 days.

(21) Appl. No.: 15/688,221

(22) Filed: Aug. 28, 2017

(65) Prior Publication Data
US 2018/0261213 A1 Sep. 13, 2018

Related U.S. Application Data

(60) Provisional application No. 62/470,821, filed on Mar. 13, 2017.

(51) Int. Cl.
*G10L 15/16* (2006.01)
*G06F 3/16* (2006.01)
(Continued)

(52) U.S. Cl.
CPC .............. *G10L 15/16* (2013.01); *G06N 3/049* (2013.01); *G06N 3/08* (2013.01); *G06F 3/16* (2013.01); *G10L 15/18* (2013.01); *G10L 21/0208* (2013.01)

(58) Field of Classification Search
CPC .......... G10L 15/02; G10L 15/16; G10L 21/10
See application file for complete search history.

(56) References Cited

U.S. PATENT DOCUMENTS

| | | | |
|---|---|---|---|
| 9,263,036 B1 * | 2/2016 | Graves | G10L 15/16 |
| 2003/0174881 A1 * | 9/2003 | Simard | G06K 9/00422 |
| | | | 382/159 |

(Continued)

OTHER PUBLICATIONS

Graves et al., "Connectionist Temporal Classification: Labelling Unsegmented Sequence Data with Recurrent Neural Networks", ICML '06 Proceedings of the 23rd international conference on machine learning, pp. 369-376. (Year: 2006).*

(Continued)

*Primary Examiner* — Paras D Shah
(74) *Attorney, Agent, or Firm* — North Weber & Baugh LLP

(57) ABSTRACT

Described herein are systems and methods for creating and using Convolutional Recurrent Neural Networks (CRNNs) for small-footprint keyword spotting (KWS) systems. Inspired by the large-scale state-of-the-art speech recognition systems, in embodiments, the strengths of convolutional layers to utilize the structure in the data in time and frequency domains are combined with recurrent layers to utilize context for the entire processed frame. The effect of architecture parameters were examined to determine preferred model embodiments given the performance versus model size tradeoff. Various training strategies are provided to improve performance. In embodiments, using only ~230 k parameters and yielding acceptably low latency, a CRNN model embodiment demonstrated high accuracy and robust performance in a wide range of environments.

20 Claims, 8 Drawing Sheets

(51) Int. Cl.
*G10L 15/18* (2013.01)
*G10L 21/0208* (2013.01)
*G06N 3/04* (2006.01)
*G06N 3/08* (2006.01)

(56) References Cited

U.S. PATENT DOCUMENTS

| | | | | |
|---|---|---|---|---|
| 2014/0257803 | A1* | 9/2014 | Yu | G06N 3/0481 |
| | | | | 704/232 |
| 2016/0099010 | A1* | 4/2016 | Sainath | G10L 25/30 |
| | | | | 704/232 |
| 2016/0104058 | A1* | 4/2016 | He | G06K 9/6255 |
| | | | | 382/156 |
| 2017/0109355 | A1* | 4/2017 | Li | G06N 7/005 |
| 2017/0148433 | A1* | 5/2017 | Catanzaro | G10L 15/02 |
| 2017/0228641 | A1* | 8/2017 | Sohn | G06F 17/11 |
| 2017/0278513 | A1* | 9/2017 | Li | G10L 15/16 |
| 2018/0018553 | A1* | 1/2018 | Bach | G06F 17/2765 |
| 2018/0061439 | A1* | 3/2018 | Diamos | G10L 21/10 |
| 2018/0068675 | A1* | 3/2018 | Variani | G10L 25/30 |
| 2018/0247643 | A1* | 8/2018 | Battenberg | G10L 15/02 |

OTHER PUBLICATIONS

Wang et al., "Trainable Frontend for Robust and Far-Field Keyword Spotting". (Year: 2016).*
Chen et al., Query-by-example keyword spotting using long short-term memory networks, 2015 IEEE International Conference on Acoustics, Speech, and Signal Processing (ICASSP). (Year: 2015).*
Li et al., "Long Short-Term Memory based Convolutional Recurrent Neural Networks for Large Vocabulary Speech Recognition". (Year: 2016).*
Hinton et al., "Distilling the Knowledge in a Neural Network" (Year: 2015).*
Zhang, Zewang, et al. "Deep recurrent convolutional neural network: Improving performance for speech recognition." arXiv preprint arXiv:1611.07174 (2016). (Year: 2016).*
Hwang et al., "Online keyword spotting with a character-level recurrent neural network," arXiv preprint arXiv:1512.08903, 2015 (10 pgs).
Fernandez et al., "An application of recurrent neural networks to discriminative keyword spotting," in Artificial Neural Networks, 2007 (10 pgs).
Lengerich et al., "An end-to-end architecture for keyword spotting and voice activity detection," arXiv preprint arXiv:1611.09405, 2016 (5 pgs).
Deng et al., "Ensemble deep learning for speech recognition," in Proceedings of Interspeech, 2014 (5 pgs).
Sainath et al., "Convolutional, long short-term memory, fully connected deep neural networks," in IEEE Proceedings of the International Conference on Acoustics, Speech and Signal Processing, 2015 (5 pgs).
Amodei et al., "Deep Speech 2: End-to-end speech recognition in English and Mandarin.," arXiv preprint arXiv:1512.02595, 2015 (28 pgs).
Cho et al., "On the properties of neural machine translation: Encoder-decoder approaches," arXiv preprint arXiv:1409.1259, 2014 (9 pgs).
Hochreiter et al., "Long Short-Term Memory," Neural Computation, 1997 (32 pgs).
Kingma et al., "Adam: A method for stochastic optimization," arXiv preprint arXiv:1412.6980, 2014 (9 pgs).
Printed from internert: <URL: http://www.apsipa.org/proceedings_2016/HTML/paper2016/186.pdf> [online], [retrieved Sep. 1, 2017] (4 pgs).
Chen et al., "Small-footprint keyword spotting using deep neural networks," in Proceedings International Conference on Acoustics, Speech, and Signal Processing, 2014 (5 pgs).
Tucker et al.,"Model compression applied to small-footprint keyword spotting," in Proceedings of Interspeech, 2016 (5 pgs).
Sindhwani et al., "Structured transforms for small-footprint deep learning," in Neural Information Processing Systems, 2015 (9 pgs).
Prabhavalkar et al., "Automatic gain control and multi-style training for robust small-footprint keyword spotting with deep neural networks," in IEEE Proceedings of the International Conference on Acoustics, Speech and Signal Processing, 2015 (5 pgs).
Anchapagesan et al., "Multi-task learning and weighted cross-entropy for dnn-based keyword spotting," in Proceedings of Interspeech, 2016 (5 pgs).
Sainath et al., "Convolutional neural networks for small-footprint keyword spotting," in Proceedings of Interspeech, 2015 (5 pgs).
Wang et al., "Trainable frontend for robust and far-field keyword spotting," arXiv preprint, arXiv:1607.05666, 2016 (5 pgs).
Shelton et al., "Comparison between auditory and visual simple reaction times," Neuroscience and medicine, 2010 (3 pgs).
Kumatani et al., "Microphone array processing for distant speech recognition: Towards real-world deployment," in IEEE Asia-Pacific Signal & Information Processing Association Annual Summit and Conference, 2012 (11 pgs).
Printed from internert: <URL: https://pdfs.semanticscholar.org/24b2/73fe6e1d8a4406f7440d00230ccf4888e70c.pdf> [online], [retrieved Sep. 1, 2017] (2 pgs).
Printed from internert: <URL: https://arxiv.org/pdf/1705.02411.pdf>[online], [retrieved Sep. 1, 2017] (7 pgs).
Printed from internert: <URL: https://pdfs.semanticscholar.org/bddf/8115d6f685d08d7deda0cf225a6859f7b186.pdf> [online], [retrieved Sep. 1, 2017] (5 pgs).

* cited by examiner

CONVOLUTIONAL RECURRENT NEURAL NETWORKS FOR SMALL-FOOTPRINT KEYWORD SPOTTING

CROSS-REFERENCE TO RELATED APPLICATION

This application claims the priority benefit under 35 USC § 119(e) to U.S. Prov. Pat. App. Ser. No. 62/470,821, filed on Mar. 13, 2017, entitled "Convolutional Recurrent Neural Networks for Small-Footprint Keyword Spotting," and listing Sercan O. Arik, Markus Kliegl, Rewon Child, Joel Hestness, Andrew Gibiansky, Christopher Fougner, Ryan Prenger, and Adam Coates as inventors. The aforementioned patent document is incorporated by reference herein in its entirety and for all purposes.

BACKGROUND

A. Technical Field

The present disclosure relates generally to systems and methods for computer learning that can provide improved computer performance, features, interfacing, and uses.

B. Description of the Related Art

The prevalence and use of computing devices has dramatically increased over the last several years. For example, computers, smartphones, tablet devices, smart sensors, and the like, are ubiquitous and used innumerable times daily by many millions of users. Lower cost, increased computing capabilities, increased functionality, and more compact sizes are among some of the factors that have contributed to the widespread adoption and use of these computing devices.

One of the continuing challenges regarding these devices is improving the interfacing. Human-device interfacing is important because it directly affects the usability of the device. Regardless of the number of useful features that a device might have, if it is difficult or cumbersome for the user to interface with the device to access or use these features, then the user's experience can be negatively impacted.

Touch screens, touch pads, physical buttons, and pointing devices, such as a stylus or mouse, are some of the conventional user interfaces. However, each interface has its own drawbacks and limitations, including requirements for specialized hardware, certain environments, and the inability to interact with users in an intuitive or natural manner.

Some devices provide voice interfaces. A primary goal of voice input is to make interfacing with a device easier and more natural. While voice interfacing has improved over the last several years, it still has significant limitations. In many instances when voice recognition software makes a transcription error, this may cause an incorrect command to be executed.

Accordingly, what is needed are high-performance systems and methods that can provide high accuracy and, thus, a satisfactory user experience.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

DETAILED DESCRIPTION OF EMBODIMENTS

Figure 1:
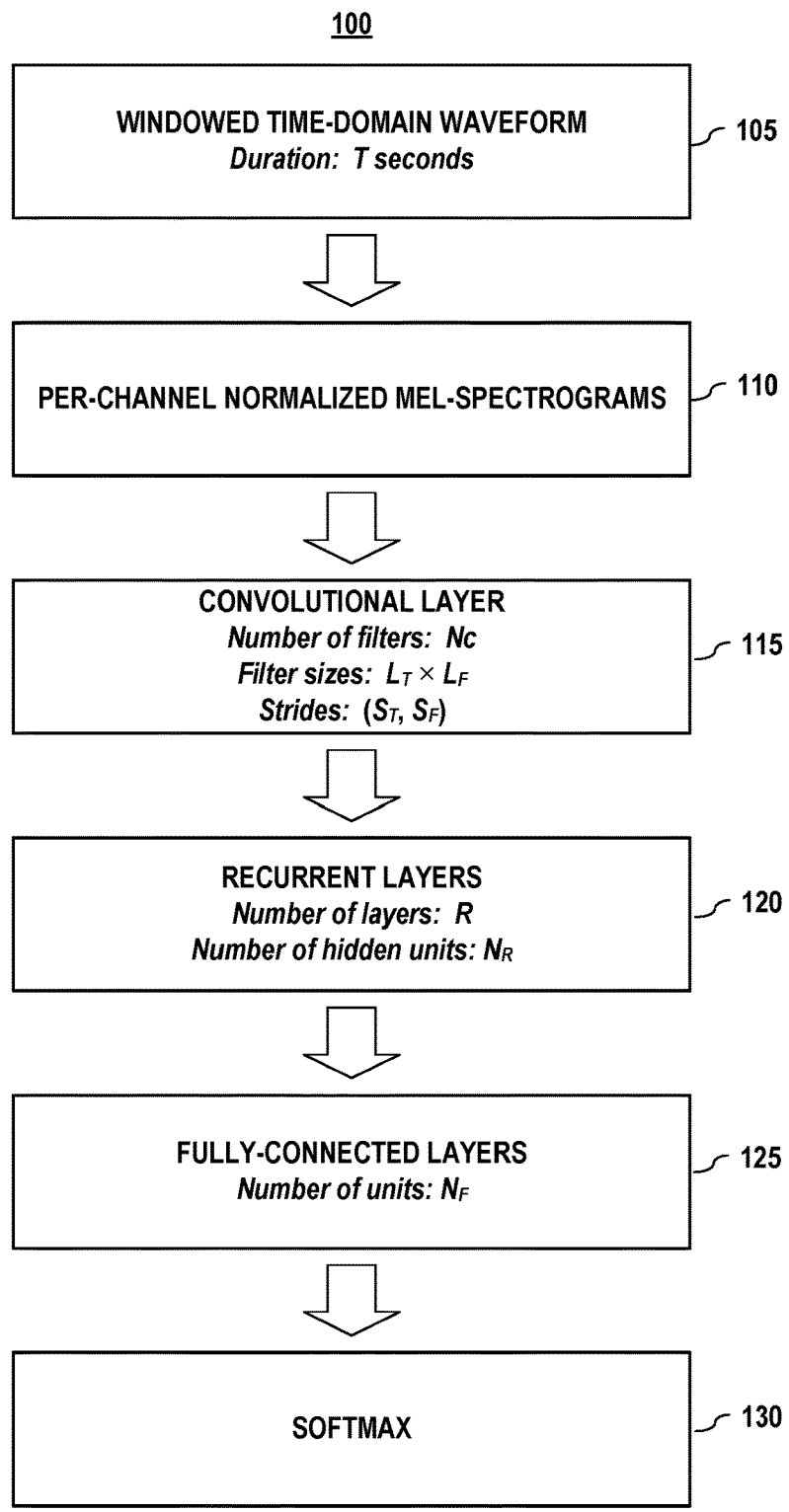
FIG. 1 depicts an end-to-end Convolutional Recurrent Neural Network architecture for keyword spotting, according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists that follow are examples and not meant to be limited to the listed items. Any headings used herein are for organizational purposes only and shall not be used to limit the scope of the description or any claims. Each document mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Motivated by the most common way humans interact with each other, conversational human-technology interfaces are becoming increasingly popular in numerous applications. High-performance speech-to-text conversion and text-to-speech conversion constitute two important aspects of such interfaces, as most computational algorithms are developed for text inputs and outputs. Another important aspect of conversational interfaces is keyword spotting (KWS) systems—also known as wakeword detection, to enable transitioning between different computational states based on the voice input provided by the users.

KWS systems aim to detect a particular keyword from a continuous stream of audio. As their output determines different states of the device, very high detection accuracy for a very low false alarm (FA) rate is extremely important to enable satisfactory user experience. Typical applications exist in environments with interference from background noise, reverberation distortion, and the sounds generated by the speaker of the device in which the KWS system is embedded. An effective KWS system should demonstrate robust performance in this wide range of situations. Furthermore, the computational complexity and model size are important concerns for KWS systems, as they are typically embedded in consumer devices with limited memory and computational resources, such as smartphones or smart home sensors.

There are already millions of devices with embedded KWS systems. Traditional approaches for KWS have been based on Hidden Markov Models with sequence search algorithms. With the advances in deep learning and increases in the amount of available data, state-of-the-art KWS systems has been replaced by deep learning-based approaches, which have been shown to yield superior performance and lower complexity.

Many of the deep-learning based small-footprint KWS systems are based on Deep Neural Networks (DNNs), which are typically combined with compression techniques or multi-style training approaches. A potential drawback of DNNs is that they ignore the structure and context of the input, which can have strong dependencies in the time or frequency domains. With the goal of exploiting such local connectivity patterns by shared weights, Convolutional Neural Networks (CNNs) have been explored for KWS systems.

A potential drawback of CNNs is that they cannot model the context over the entire frame without wide filters or great depth. Recurrent neural networks (RNNs) have been studied for KWS systems using connectionist temporal classification (CTC) loss (unlike all the aforementioned DNN and CNN models, which use cross entropy loss); however, given the ambitious targets of the applications of such systems, a high accuracy at a low FA rate has not yet been obtained. Similar to DNNs, a potential limitation of RNNs is that the modeling is done on the input features, without learning the structure between successive time and frequency steps. Previously, a Convolutional Recurrent Neural Network (CRNN) architecture trained with CTC loss has been proposed. However, despite the large model size, similar to RNNs, a high accuracy at a low FA rate could not be obtained.

Presented herein are embodiments of systems and methods that resulted from focusing on developing production-quality KWS systems using convolutional recurrent neural networks (CRNNs) with cross-entropy loss for a small-footprint model, applied for a single keyword. One of the goals was to combine the strengths of CNNs and RNNs—with additional strategies applied during training to improve overall performance—while keeping a small-footprint size.

B. Small-Footprint Keyword Spotting

1. End-to-End Architecture Embodiments

In embodiments, a canonical CRNN architecture, inspired by the successful large-scale speech recognition systems, was considered as a starting point. To adapt these architectures for small-footprint KWS, the model size should preferably be shrunk two to three orders of magnitude. The impact of different parameters was analyzed on performance while shrinking the size of the model.

FIG. 1 depicts an end-to-end CRNN architecture for keyword spotting, according to various embodiments of the present disclosure. Also shown in FIG. 1 are corresponding parameters. In embodiments, the raw time-domain inputs are converted to Per-Channel Energy-Normalized (PCEN) mel spectrograms 105, for succinct representation and efficient training. In embodiments, other input representations such as conventional or mel spectrograms may be used. In embodiments, spectrogram features, e.g., two-dimensional (2-D) PCEN features 110 serve as efficient low-dimensional inputs to convolutional layer 115.

In embodiments, PCEN input representation may be used as an alternative to the conventional spectrogram or (log) mel spectrogram as input representation. In embodiments, PCEN replaces the static log compression by a dynamic compression described as:

$$PCEN(t, f) = \left( \frac{E(t, f)}{(\epsilon + M(t, f))^\alpha} + \delta \right)^r - \delta^r$$

where t and f denote time and frequency index and $E(t, f)$ denotes filterbank energy in each time-frequency bin. Although there is no restriction on the type of filterbank that may be used, a Fast Fourier Transform (FFT)-based mel filterbank may be used for compact representation. $M(t, f)$ is a smoothed version of the filterbank energy $E(t, f)$ and may be computed using a first-order infinite impulse response filter:

$$M(t,f)=(1-s)M(t-1,f)+sE(t,f)$$

where s is the smoothing coefficient, $\in$ is a relatively small constant that is used to prevent division by zero. In embodiments, the term $$\frac{E(t, f)}{(\epsilon + M(t, f))^\alpha}$$

serves to implement a form of feed-forward automatic gain control (AGC). The AGC strength (or gain normalization strength) may be controlled by the parameter $\alpha \in [0, 1]$, where larger a indicates stronger gain normalization. It is noted that due to smoothing, M(t, f) may carry mainly the loudness profile of E(t, f), which may subsequently be normalized out. It is further noted that this operation is causal and, in embodiments, may be performed independently for each channel, making it suitable for real-time implementation. The AGC emphasizes changes relative to recent spectral history and adapts to channel effects including loudness. In embodiments, the following values are assumed herein: $\alpha$=0.98, s=0.025, $\delta$=2, r=0.5 and $\in$=$10^{-6}$.

In embodiments, 2-D PCEN features are inputs the convolutional layer 115. Convolutional layer 115 may employ 2-D filtering along both the time and frequency dimensions. In embodiments, the outputs of convolutional layer 115 may be fed to bidirectional recurrent layers 120, which may comprise gated recurrent units (GRUs) or long short-term memory (LSTM) units and process the entire frame. As shown in FIG. 1, outputs of the recurrent layers 120 are given to a fully connected (FC) layer 125. Lastly, softmax decoding 130 may be applied over two neurons, to obtain a corresponding scalar score. In embodiments, rectified linear units were used as activation function in all layers.

2. End-to-End Training Embodiments

In speech recognition, large-scale architectures with recurrent layers typically use variants of CTC loss to decode the most probable output label. Aside from the modeling limitations of CTC due to conditional independence assumptions of targets, CTC loss tends to have a high computational complexity and typically yields good performance only when the model capacity is sufficiently large to efficiently learn from a large dataset. Since a focus of embodiments herein is on small-footprint architectures, the loss function that is optimized during the training is a cross-entropy loss for the estimated and target binary labels, indicating whether a frame corresponds to a keyword or not.

To train with a cross-entropy loss, unlike CTC, precise alignment of the training samples typically is important. In embodiments, a large-scale speech recognition model, such as a Deep Speech 2 embodiment, may be used to obtain the estimated probability distributions of keyword characters $c_k$ ($1 \le k \le K$) for each time instance. Embodiments of Deep Speech 2 are described in commonly-owned: U.S. Prov. Pat. App. Ser. No. 62/260,206, filed on 25 Nov. 2015, entitled "Deep Speech 2: End-to-End Speech Recognition in English and Mandarin"; U.S. patent application Ser. No. 15/358,102 filed on 21 Nov. 2016, entitled "END-TO-END SPEECH RECOGNITION"; and U.S. patent application Ser. No. 15/358,083, filed on 21 Nov. 2016, entitled "DEPLOYED END-TO-END SPEECH RECOGNITION". Each of the aforementioned patent documents is incorporated by reference herein in its entirety and for all purposes.

As the CTC decoding yields peaked distributions, in embodiments, outputs are smoothed over time, and smoothed character occupancy scores $p(c_k, t)$ are obtained. In embodiments, the beginning and end times of the keywords are then obtained using a simple heuristic methodology, such as one like that shown below as Method 1. An extra short padding may be added while chopping the keywords to cover edge cases. The accuracy of alignments obtained were significantly beyond the time scale of human perception.

Method 1—Sequential Alignment of Keyword Samples

--- require: keyword characters $c_k (1 \le k \le K)$, smoothed character occupancy scores $p(c_k, t)$, decay rate $\alpha (0 \le \alpha \le 1)$
initialize: $p^{lr}(c_k, t) = p(c_k, t)$, $p^{rl}(c_k, t) = p(c_k, t)$
for: n := 1 to $N_{iter}$
  for: k := 0 to K − 2 (right-to-left decoding)

$$T_{c_k}^{rl} = \underset{t}{\mathrm{argmax}}\ p^{rl}(c_k, t)$$

$p^{rl}(c_{k+1}, t) = \alpha \cdot p^{rl}(c_{k+1}, t)$ for $t \ge T_{c_k}^{rl}$
  end
  for: k := K − 1 to 1 (left-to-right decoding)

$$T_{c_k}^{lr} = \underset{t}{\mathrm{argmax}}\ p^{lr}(c_k, t)$$

$p^{lr}(c_{k-1}, t) = \alpha \cdot p^{lr}(c_{k-1}, t)$ for $t \le T_{c_k}^{lr}$
  end
end
return: $(\min(T_{c_1}^{lr}, T_{c_1}^{rl}), \max(T_{c_K}^{lr}, T_{c_K}^{rl}))$

---

In embodiments, the sequential alignment method may input the keyword characters $c_k$ ($1 \le k \le K$) (e.g., $c_1$='t', $c_2$='a', $c_3$='l', etc., for the keyword 'talktype'), corresponding smoothed character occupancy scores $p(c_k, t)$ obtained by smoothing the output of a speech transcription model such as Deep Speech 2 (e.g., by convolving with a Gaussian impulse response), and a decay rate $\alpha$ ($0 \le \alpha \le 1$). In embodiments, for $N_{iter}$ iteration steps, the method repeatedly applies right-to-left decoding and left-to-right decoding to update $p^{lr}(c_k, t)$ and $p^{rl}(c_k, t)$, which may initially be equated to $p(c_k, t)$. In embodiments, the right-to-left decoding step may try to reduce the probability of the character at the locations after the most probable current location, whereas the left-to-right decoding step tries to reduce the probability of the character before the most probable current location. In other words, both steps try to ensure that the most probable locations for the characters in a keyword occur in an ordered way (e.g., the most probable location for 't' is before 'a' and the most probable location for 'a' is before 'l', etc., for the keyword 'talktype').

C. Experiments and Results

It shall be noted that these experiments and results are provided by way of illustration and were performed under specific conditions using a specific embodiment or embodiments; accordingly, neither these experiments nor their results shall be used to limit the scope of the current disclosure.

1. Data and Training

In embodiments, a KWS system is developed for the keyword "TalkType" (which may be pronounced as a single word or as two words). A frame length of T=1.5 seconds may be chosen, which is sufficiently long to capture "Talk-Type" for almost all of the samples after alignment. It shall be understood that the techniques discussed herein may be applied to any other keyword as long as the frame length T and the dataset are chosen appropriately.

Using a sampling rate of 16 kHz, each frame may contain 24 k raw time-domain samples. Corresponding PCEN mel spectrograms may be obtained, e.g., for 10 ms stride and 40 frequency channels, yielding an input dimensionality of 40×151.

In embodiments, a data set may comprise about 16 k different keyword samples, collected from more than 5 k speakers. Approximately 2 k samples are used in the development and test sets, and approximately 12 k samples are used for training (approximately a 1:1:6 ratio). In embodiments, training samples are augmented by applying additive noise, with a power determined by a signal-to-noise ratio (SNR) values between −5 and 15 dB. The additive noise may be sampled from representative background noise and speech samples, with a total length exceeding 300 hours. In embodiments, to provide robustness against alignment errors, training samples may be augmented, e.g., by introducing random timing jitter.

In embodiments, the ADAM optimization algorithm for training (proposed by D. Kingma, and J. Ba in "Adam: A Method For Stochastic Optimization," arXiv preprint arXiv: 1412.6980, 2014 and is available at https://arxiv.org/abs/1412.6980, which is incorporated by reference in its entirety herein), with a batch size of 64, may be used. An initial learning rate is initially chosen (e.g., 0.001) and adjusted (e.g., to 0.0003). In embodiments, while tracking convergence, a precision-recall tradeoff for a desired point of operation may be monitored.

In embodiments, an evaluation may consider a streaming scenario such that inference is performed for overlapping frames of duration T. The shift between frames, e.g., 100 ms, should be chosen as longer than the spectrogram stride and shorter than the inference latency (see Sec. C2 below). Metrics of interest may be false rejection rate (FRR) and false alarms (FA) per hour. In embodiments, the latter is fixed at a desired value, e.g., 1 FA/hour. In embodiments, noise, having a magnitude depending on the SNR value, may be added to the development and test sets. It should be noted that if the collected samples are noisy, per definition of SNR as ratio of powers of the information-bearing signal to the noise signal, the actual SNR will be lower. Similar to the augmentation of the training sets, negative samples and noise datasets may be sampled from representative background noise and speech samples.

2. Impact of Embodiments of the Model Architecture

TABLE 1

Performance of CRNN architectures (see FIG. 1 for the description parameters).

| Convolutional | | | Recurrent | | | FC | Total number | FRR (%) for the noise development set with 5 dB SNR | |
|---|---|---|---|---|---|---|---|---|---|
| $N_C$ | $(L_T, L_F)$ | $(S_T, S_F)$ | R | $N_R$ | Recurrent unit | $N_F$ | of parameters | at 1 FA/hour | at 0.5 FA/hour |
| 32 | (20, 5) | (8, 2) | 2 | 8 | GRU | 32 | 45k | 5.54 | 7.44 |
| 32 | (20, 5) | (8, 2) | 3 | 8 | LSTM | 64 | 68k | 6.17 | 7.68 |
| 32 | (5, 1) | (4, 1) | 2 | 8 | GRU | 64 | 102k | 6.04 | 7.31 |
| 32 | (20, 5) | (8, 2) | 2 | 16 | GRU | 64 | 110k | 3.48 | 4.46 |
| 32 | (20, 5) | (20, 5) | 2 | 32 | GRU | 64 | 110k | 5.70 | 7.99 |
| 32 | (20, 5) | (8, 2) | 3 | 16 | GRU | 64 | 115k | 3.42 | 4.10 |
| 16 | (20, 5) | (8, 2) | 2 | 32 | GRU | 32 | 127k | 3.53 | 5.55 |
| 32 | (20, 5) | (12, 4) | 2 | 32 | GRU | 64 | 143k | 5.80 | 7.72 |
| 16 | (20, 5) | (8, 2) | 1 | 32 | GRU | 64 | 148k | 4.20 | 6.27 |
| 128 | (20, 5) | (8, 2) | 3 | 8 | GRU | 32 | 159k | 3.83 | 5.21 |
| 64 | (10, 3) | (8, 2) | 1 | 16 | GRU | 32 | 166k | 3.21 | 4.31 |
| 128 | (20, 5) | (8, 2) | 1 | 32 | LSTM | 64 | 197k | 3.37 | 4.56 |
| 32 | (20, 5) | (12, 2) | 2 | 32 | GRU | 64 | 205k | 3.26 | 4.40 |
| 32 | (20, 5) | (8, 2) | 1 | 32 | GRU | 64 | 211k | 3.00 | 3.84 |
| 32 | (20, 5) | (8, 2) | 2 | 32 | GRU | 64 | 229k | 2.85 | 3.79 |
| 32 | (40, 10) | (8, 2) | 2 | 32 | GRU | 64 | 239k | 3.57 | 5.03 |
| 32 | (20, 5) | (8, 2) | 3 | 32 | GRU | 64 | 248k | 3.00 | 3.42 |
| 32 | (20, 5) | (8, 2) | 2 | 32 | LSTM | 64 | 279k | 3.06 | 4.41 |
| 32 | (20, 5) | (8, 1) | 2 | 32 | GRU | 64 | 352k | 2.23 | 3.31 |
| 64 | (20, 5) | (8, 2) | 2 | 32 | GRU | 64 | 355k | 2.43 | 3.99 |
| 64 | (20, 5) | (8, 2) | 2 | 32 | LSTM | 32 | 407k | 3.11 | 4.04 |
| 64 | (10, 3) | (4, 1) | 2 | 32 | GRU | 64 | 674k | 3.37 | 4.35 |
| 128 | (20, 5) | (8, 2) | 2 | 32 | GRU | 128 | 686k | 2.64 | 3.78 |
| 32 | (20, 5) | (8, 2) | 2 | 128 | GRU | 128 | 1513k | 2.23 | 2.95 |
| 256 | (20, 5) | (8, 2) | 4 | 64 | GRU | 128 | 2551k | 2.18 | 3.42 |
| 128 | (20, 5) | (4, 1) | 4 | 64 | GRU | 128 | 2850k | 2.64 | 3.21 |

As noted, Table 1 shows the performance of various CRNN architecture model embodiments for a development set having a 5 dB SNR. It should be noted that all models are trained until convergence, even though this requires different numbers of epochs. An observed general trend is that a larger model size typically yields better performance. In embodiments, increasing the number of convolution filters and/or recurrent hidden units are two effective approaches to improve the performance while increasing the model size. In embodiments, increasing the number of recurrent layers has a limited impact, and GRU is preferred over LSTM as a better performance may be obtained for a lower complexity.

In embodiments, the model size of the KWS model is reduced based on resource constraints, such as inference latency, memory limitations, and power consumption requirements. Following T. N. Sainath and C. Parada in "Convolutional neural networks for small-footprint keyword spotting," in Proceedings of Interspeech, 2015, pp. 1478-1482 (hereinafter, "Sainath et al.") (which is incorporated by reference in its entirety herein), the number of parameters may be limited to less than 250 k, which is more than 6 times smaller than other architectures using CTC loss. For the rest of this section, the default architecture is the set of parameters in bold, which also corresponds to a fairly optimal point given the model size vs. performance trade-off for the dataset.

The performance was also compared to a CNN architecture based on Sainath et al. Given the discrepancy in input dimensionality and training data, the model hyperparameters are reoptimized for the best performance, while upper-bounding the number of parameters to 250 k for a fair comparison. For the same development set having a 5 dB SNR, the best CNN architecture model embodiment achieves 4.31% FRR at 1 FA/hour and 5.73% FRR at 0.5 FA/hour. Both metrics are ~51% higher compared to the FRR values of the chosen CRNN model with 229 k parameters. Interestingly, the performance gap is lower for higher SNR values, which is elaborated on in Section C.4.

In embodiments, a bidirectional model that runs on overlapping 1.5 second windows at a 100 ms stride allows inference to be performed faster than real-time due to small model size and a large time stride of 8 in the initial convolution layer. The inference computational complexity of the chosen CRNN-based KWS model embodiment with 229 k parameters is ~30 M floating point operations (FLOPs) when implemented on processors of modern consumer devices (without special functions to implement nonlinear operations). As nonlinear operations constitute a high portion of the overall computational complexity, in embodiments, a potential reduction in computational complexity may be achieved without using function approximations or adding special function units to processing cores as in graphical processing units. Even when implemented on modern smartphones without any approximations and special function units, embodiments of the KWS model achieve an inference time that is relatively faster than the human reaction time to auditory stimuli, which is ~280 ms. Hence, seamless real-time operation can easily be enabled for applications with conversational speech interfaces.

Figure 2:
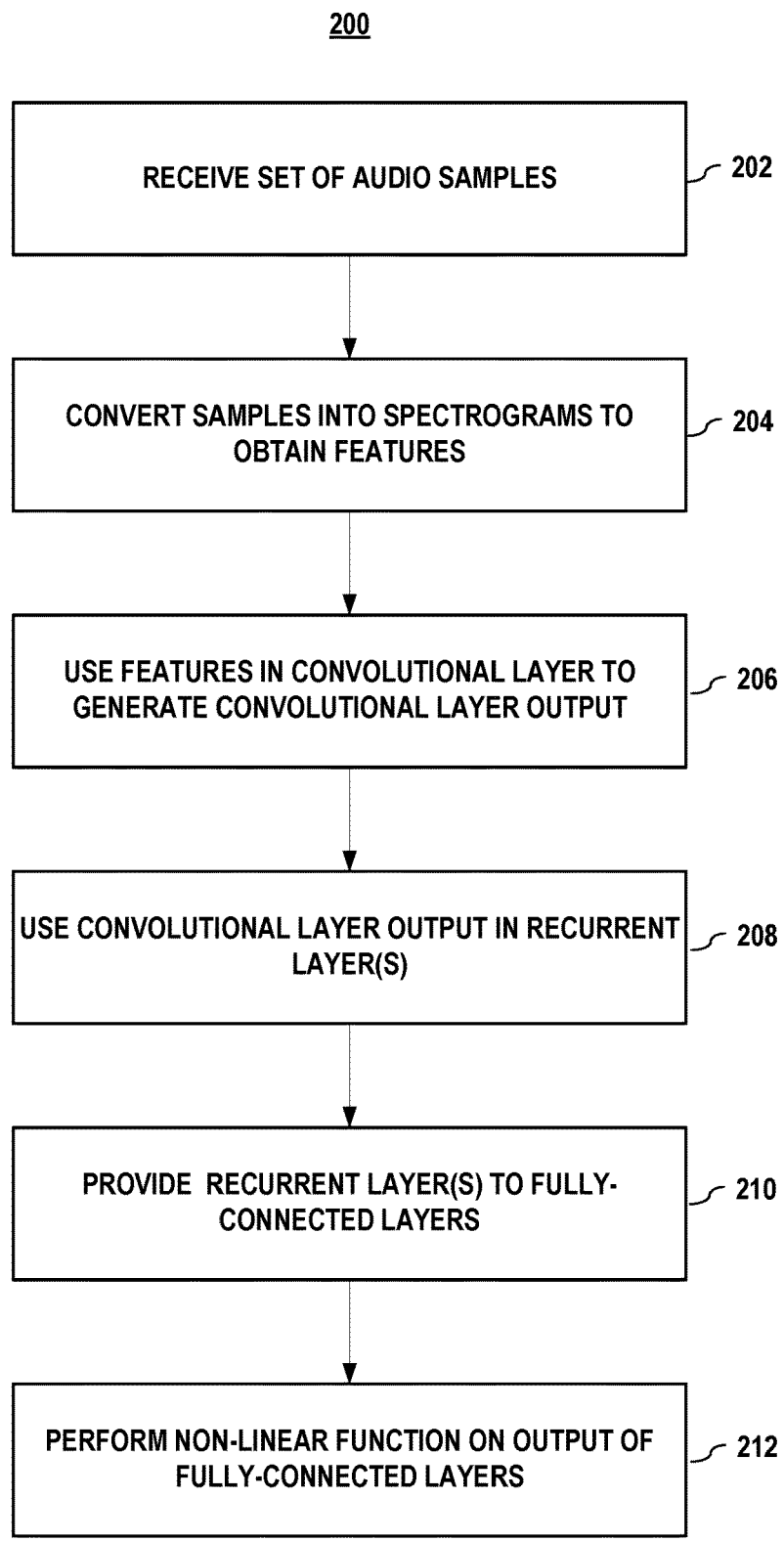
FIG. 2 depicts a process for training a small-footprint keyword spotting architecture according to FIG. 1.

FIG. 2 illustrates a process for training a small-footprint keyword-spotting model architecture that comprises an end-to-end convolutional recurrent neural network to identify keywords. Process 200 begins when a set of audio samples that each comprises a keyword is received (202). In embodiments, the keywords having been previously aligned by using an alignment process that enables a use of a cross-entropy loss function. The alignment process is further described with reference to FIG. 3.

In embodiments, the set of audio samples is converted (204) into spectrograms, e.g., Per-Channel Energy-Normalized (PCEN) mel spectrograms, in order to obtain features.

In embodiments, the features may be used (206) in one or more convolutional layers to generate a convolutional layer output. In embodiments, the convolutional layer may apply a multi-dimensional filter to the spectrograms. In embodiments, the convolutional layer output is used in at least one recurrent layer to generate a recurrent layer output.

In embodiments, the recurrent layer output is provided (208) to a number of fully connected layers.

In embodiments, a nonlinear function is performed (210) on an output of the fully connected layers to obtain a probability score that corresponds to a probability that a sample in the set of audio samples comprises the keyword. In embodiments, the probability score may be used in a cross-entropy loss function to adjust a model parameter of a convolutional layer.

Figure 3:
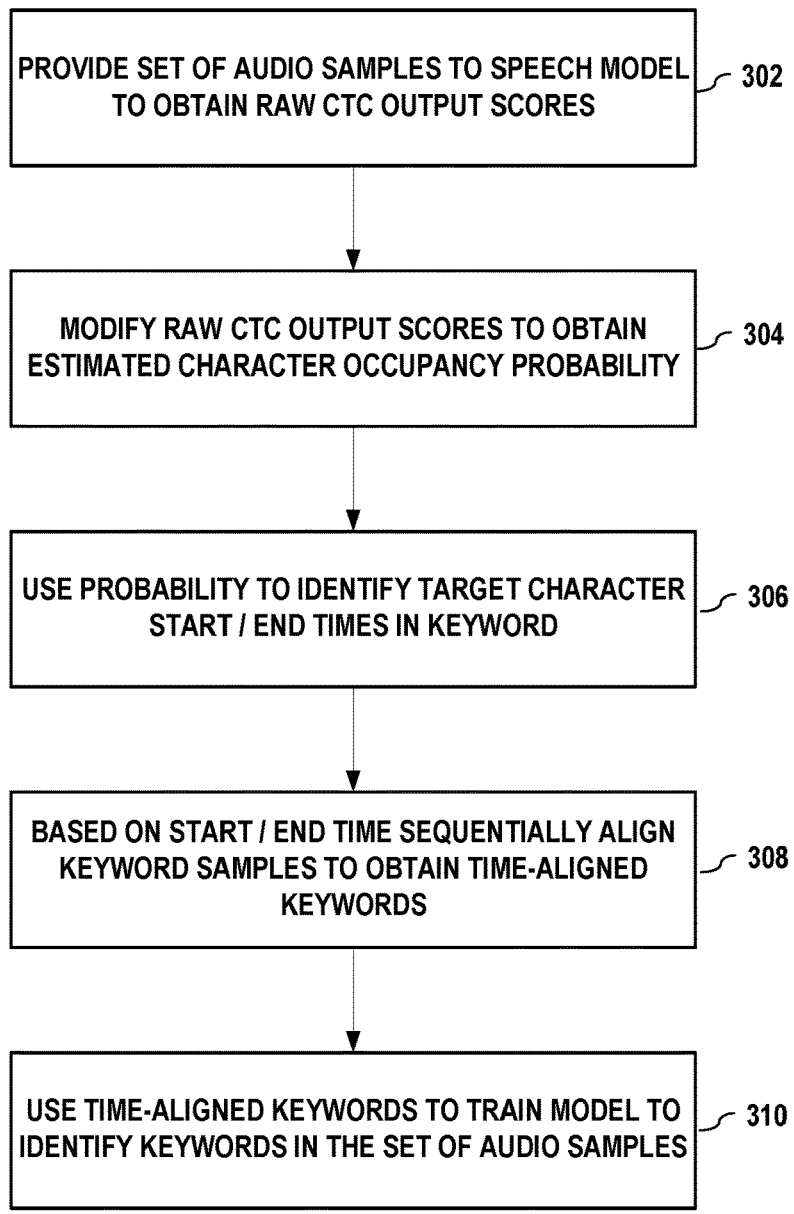
FIG. 3 depicts a process for aligning keywords to enable the process for training in FIG. 2.

FIG. 3 depicts a process for aligning keywords to enable the process for training in FIG. 2. Process 300 in FIG. 3 begins when a set of audio samples is provided (302) to a speech model to obtain raw CTC output scores.

In embodiments, the raw CTC output scores may be modified to obtain (304) an estimated character occupancy probability of keyword characters for each time instance in an audio sample. In embodiments, the estimated character occupancy probability may be expressed in a probability matrix of time-to-character data that, for example, maps characters to acoustic signals in the audio sample. In embodiments, the raw CTC output scores are adjusted according to an expected order of the keyword characters, e.g., by imposing the expected order of characters as a condition. In embodiments, the model parameters may be adjusting by modifying probability scores in response to a condition being met. It is understood that a condition, e.g., first keyword character preceding a second keyword character, may equally be the non-occurrence of an event.

In embodiments, the estimated character occupancy probability distribution may be used to identify (306) start or end times of a target character in the keyword, e.g., by associating time values with peak estimated probabilities for a particular character in a keyword.

In embodiments, based on at least one of a start time and an end time of the keyword, the keyword samples may be sequentially aligned (310) to obtain time-aligned keywords.

In embodiments, at least some of the time-aligned keywords may be used (312) as training samples to train the small-footprint keyword-spotting model architecture to identify keywords in the set of audio samples. In embodiments, the set of audio samples may be combined with a set of impulse responses to construct a far-field training test set. For a given distance, for example, each impulse response may be associated with audio signals representing a different acoustic environment. In embodiments, a mismatch signal, e.g., a noise signal or random jitter, may be added to the set of audio samples to enhance detection performance in the presence of mismatch signals to provide robustness against alignment errors caused by noisy environments.

It shall be understood that aligning may comprise cropping unwanted acoustic data from the keywords in the set of audio samples to increase signal fidelity. Further, padding maybe added to the beginning and ends of a cropped sample.

Figure 4:
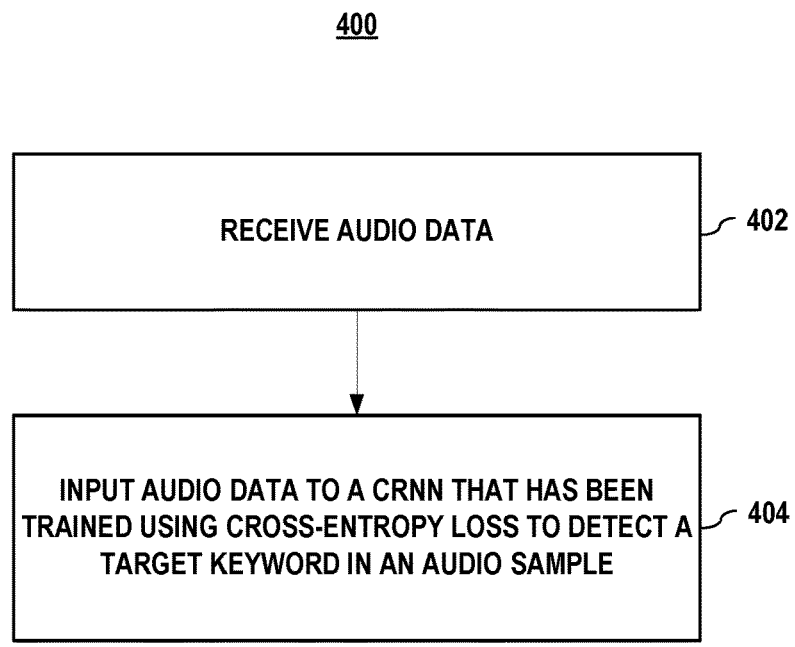
FIG. 4 depicts a process for using a small-footprint keyword spotting architecture according to FIG. 1.

FIG. 4 depicts a process for using a small-footprint keyword spotting architecture according to FIG. 1. Process 400 in FIG. 4 begins by receiving (402) audio data.

In embodiments, the audio data maybe input (404) to a CRNN that has been trained using cross-entropy loss to detect a target keyword in an audio sample, e.g., by using a training method according to FIG. 2. In embodiments, the training method may use hard negative mining to improve detection performance by identifying and using unwanted samples as negative samples to further train a model. In embodiments, the hard negative mining may comprise applying a data set to the model to identify frames for which the model detects false alarms, and using those frames as the negative samples.

3. Impact of the Amount of Training Data

Figure 5:
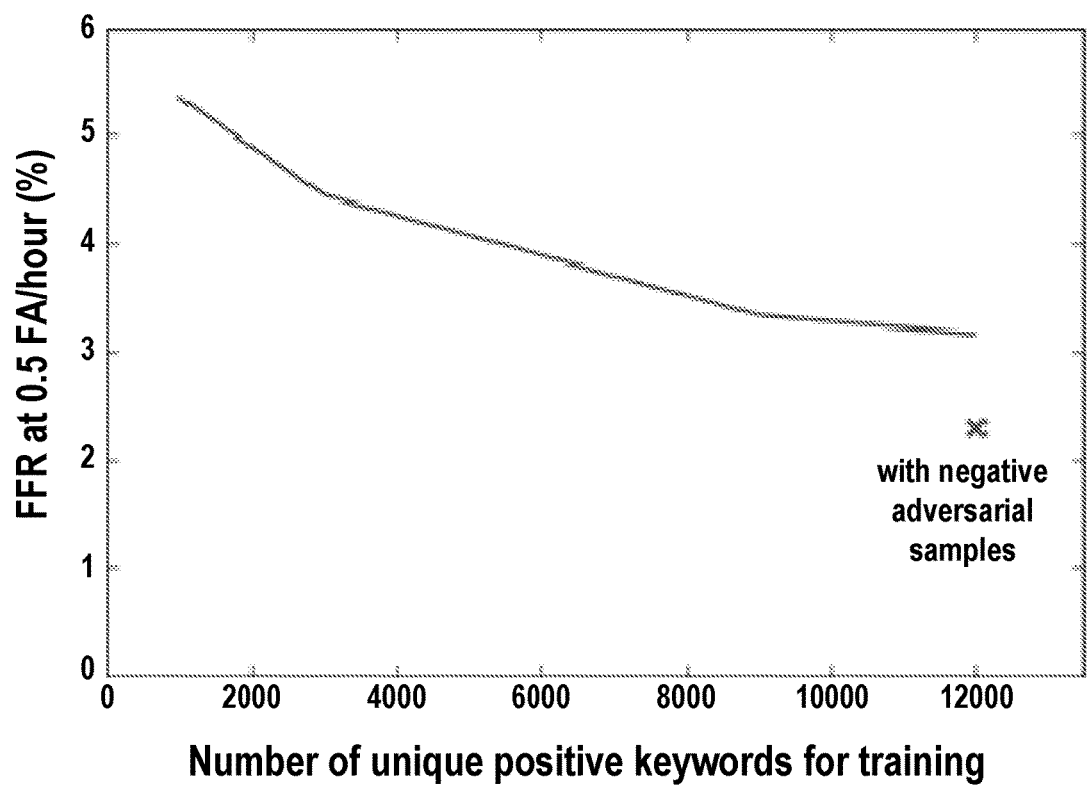
FIG. 5 depicts false rejection rate (FRR) at 0.5 false alarms (FA) per hour versus the number of unique training keywords for a test set having a 5 dB signal-to-noise ratio (SNR), according to various embodiments of the present disclosure.

Given the representation capacity limit imposed by the architecture size, increasing the amount of positive samples in the training data has a limited effect on the performance. FIG. 5 depicts false rejection rate (FRR) at 0.5 false alarms (FA) per hour versus the number of unique training keywords for the test set having a 5 dB signal-to-noise ratio (SNR), according to various embodiments of the present disclosure. Specifically, FIG. 5 shows the FRR at 0.5 FA/hour (for the test set having 5 dB SNR) vs. the number of unique "TalkType" samples used while training. Saturation of performance occurs faster than applications with similar type of data but with large-scale models.

Besides increasing the amount of the positive samples, in embodiments, performance is improved by increasing the diversity of relevant negative adversarial samples, obtained by hard mining. Performance benefits of adversarial training in the form of regularization have been previously demonstrated. To generate adversarial samples, popular approaches, especially in computer vision applications, are based on adding gradient-based perturbations to create artificial samples. Instead, in embodiments, realistic adversarial samples are collected by using the pre-converged model on a very large public video dataset (not used in training, development, or test sets). In embodiments, training is performed by using the collected adversarial samples as negative training samples until convergence. As shown in FIG. 5, adversarial training yields decrease in FRR for the test set.

4. Noise Robustness

Figure 6:
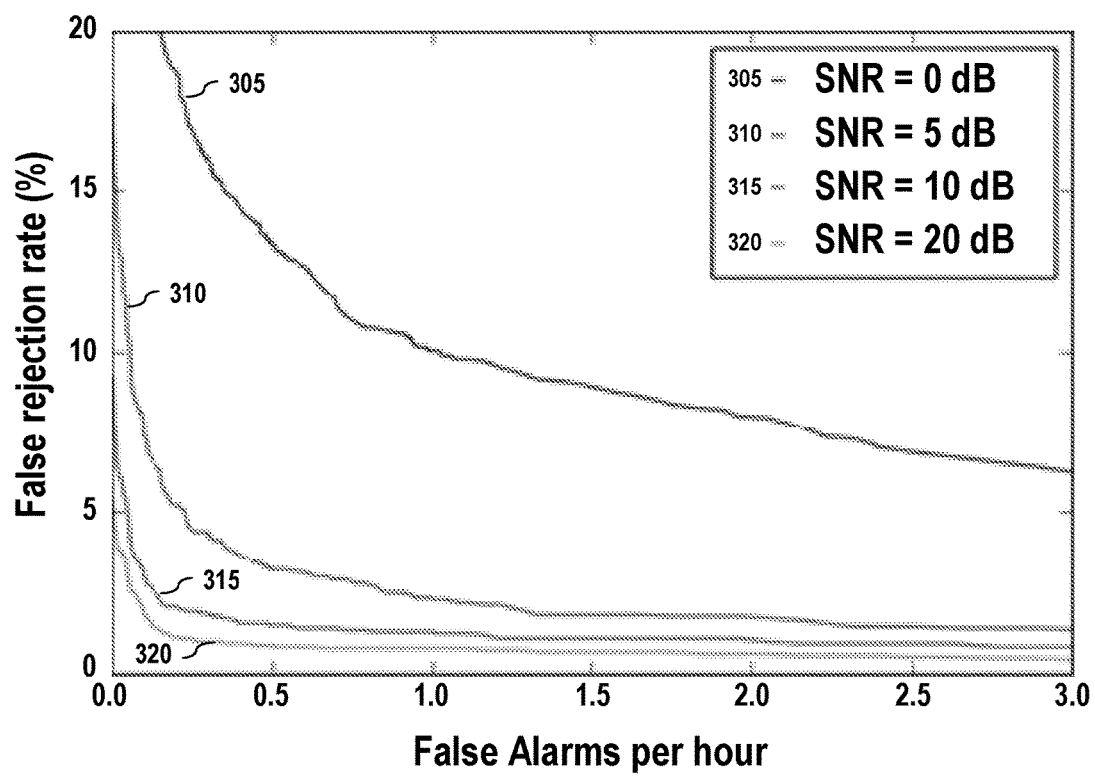
FIG. 6 depicts FRR vs. FA per hour for a test set with various SNR values, according to various embodiments of the present disclosure.

FIG. 6 shows the FRR vs. FA per hour for the chosen CRNN model embodiment for a test set with various signal-to-noise ratio (SNR) values, according to various embodiments of the present disclosure. For higher SNR, lower FRR is obtained, and stable performance started for a lower FA rate. It is noted that the SNR values (in dB) of the augmented training samples are sampled from a distribution with a mean of 5 dB, and deterioration in performance is observed beyond this value. Performance for lower SNR values may be improved by augmenting with lower SNR, even if this may come at the expense of decreased performance for higher SNR.

The benefit of recurrent layers was observed especially for lower SNR values. The performance gap of CRNN architectures with CNN architectures (adapted from Sainath et al. as explained in Section C.1) reduced as the SNR increased. This may be because the recurrent layers are better able to adapt to the noise signature of individual samples, since each layer processes information from the entire frame. CNNs, in contrast, require wide filters and/or great depth for this level of information propagation.

5. Far-Field Robustness

The dataset already comprises samples recorded at varying distance values, which should be representative for most applications such as for smartphone KWS systems. Yet, some applications, such as smart-home KWS systems, may require high performance at far-field conditions.

Figure 7:
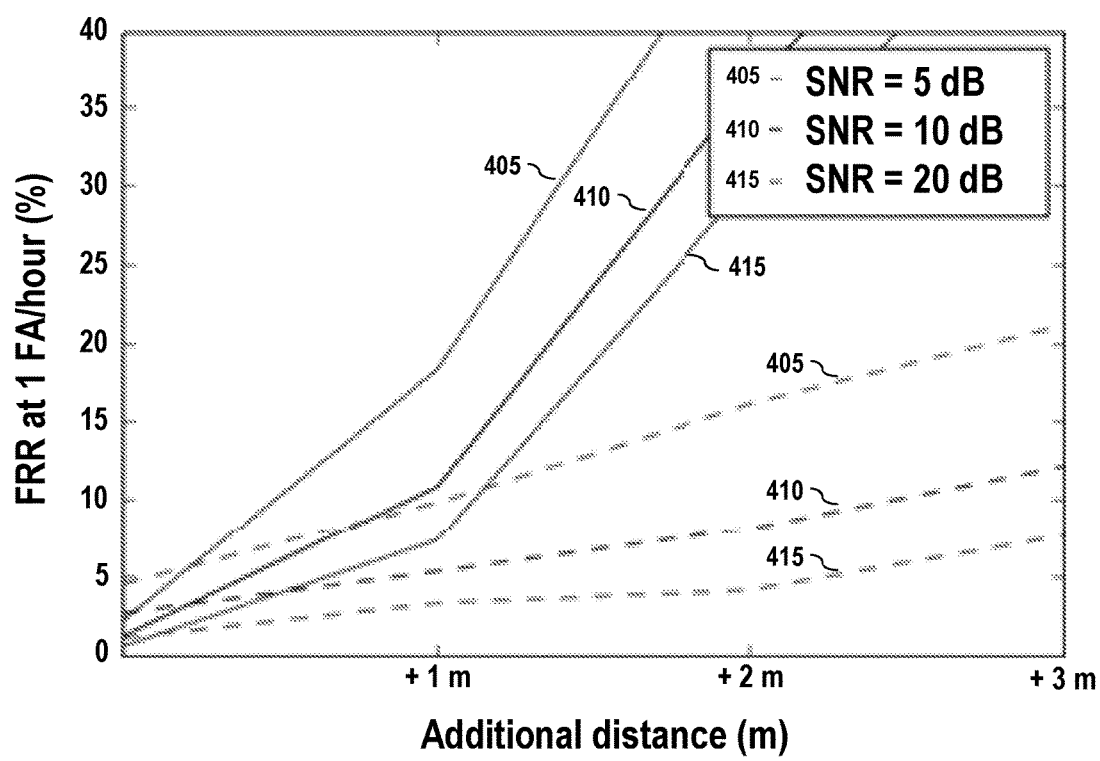
FIG. 7 depicts FRR at 1 false alarm FA per hour vs. additional distance for far-field test sets with varying SNR values, according to various embodiments of the present disclosure.

FIG. 7 depicts false rejection rate (FRR) at 1 false alarm (FA) per hour vs. additional distance for far-field test sets with varying signal-to-noise ratio (SNR) values, in which solid lines correspond to embodiments with baseline performance and dashed line correspond to embodiments with far-field augmented training, according to various embodiments of the current disclosure. FIG. 7 shows performance degradation with the additional distance for the chosen CRNN model embodiment. Far-field test sets are constructed by augmenting the original test set with impulse responses corresponding to a variety of configurations at the given distance (considering different values for degrees of arrival etc.). Significant deterioration in performance is observed especially in conjunction with higher noise. To provide robustness against this deterioration, training with far-field-augmented training samples, using a variety of impulse responses that are different than the ones in the test set, may be used. This augmentation achieves significantly less degradation in performance for farther distances. Yet, it yields a worse performance for the original data set due to training/testing mismatch.

D. Some Conclusions

Various embodiments of CRNNs are examined for small-footprint KWS systems. A trade-off between model size and performance is presented, and an embodiment with a preferred choice of parameters given the tradeoff is demonstrated. The capacity limitation of some model embodiments has various implications. In embodiments, performance gains are limited by merely increasing the number of positive samples, yet using negative adversarial samples while training improves the performance. Also, training sets should be carefully chosen to reflect the application environment, such as the noise or far-field conditions. Overall, at 0.5 FA/hour (which is an acceptable value from a user perspective), a tested model embodiment achieved 97.71%, 98.71%, and 99.3% accuracy for the test set having 5 dB, 10 dB, and 20 dB SNR values, respectively.

E. System Embodiments

In embodiments, aspects of the present disclosure may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart sensor, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 8:
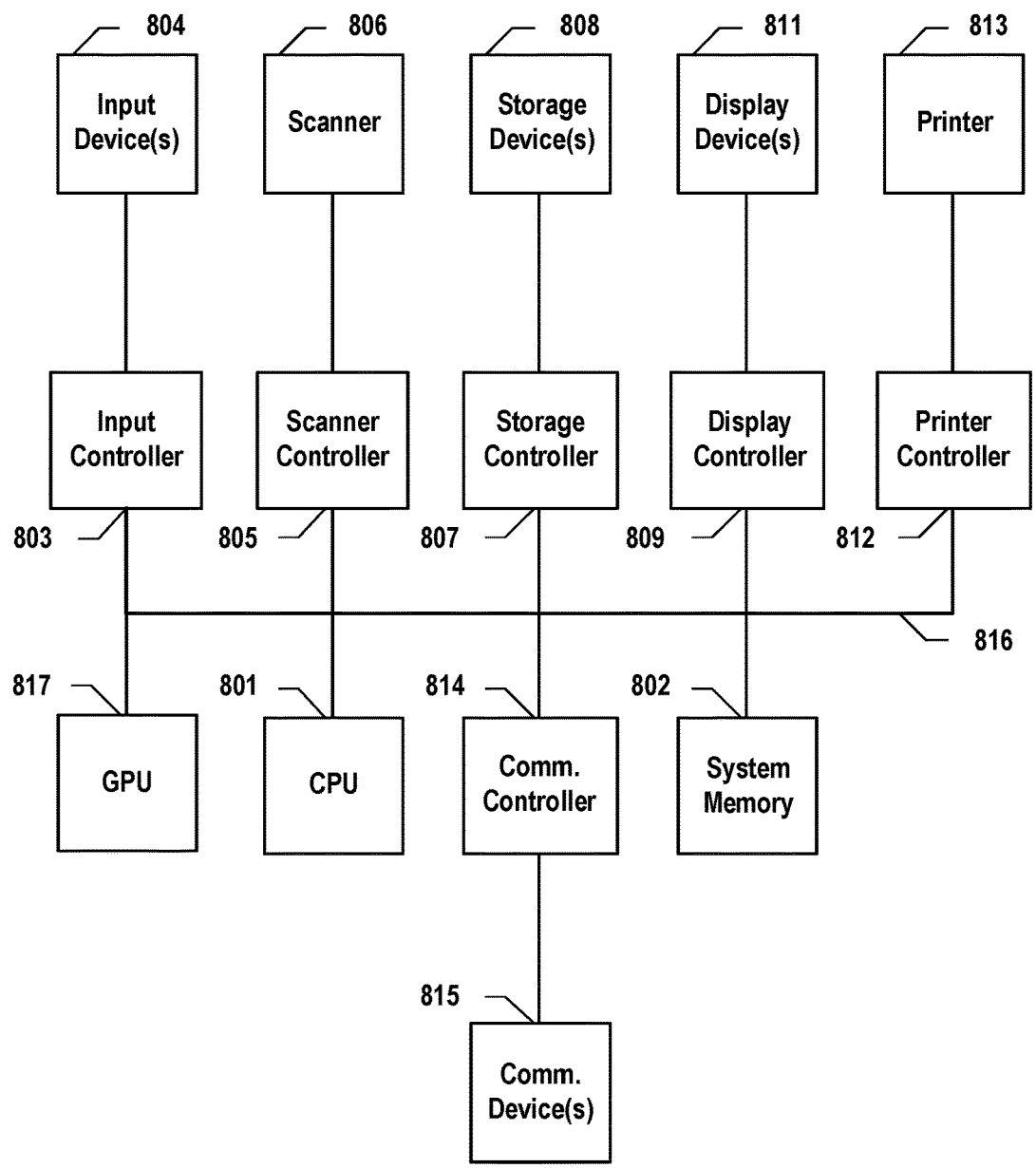
FIG. 8 depicts a simplified block diagram of a computing device/information handling system, in accordance with embodiments of the present disclosure.

FIG. 8 depicts a simplified block diagram of a computing device/information handling system (or computing system) according to various embodiments of the present disclosure. It will be understood that the functionalities shown for system 800 may operate to support various embodiments of an information handling system—although it shall be understood that an information handling system may be differently configured and include different components.

As illustrated in FIG. 8, system 800 includes one or more central processing units (CPU) 801 that provides computing resources and controls the computer. CPU 801 may be implemented with a microprocessor or the like, and may also include one or more graphics processing units (GPU) 817 and/or one or more floating point coprocessors for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, or stylus. There may also be a scanner controller 805, which communicates with a scanner 806. System 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present invention. Storage device(s) 808 may also be used to store processed data or data to be processed in accordance with the invention. System 800 may also include a display controller 809 for providing an interface to a display device 811, which may be a cathode ray tube (CRT), a thin film transistor (TFT) display, or other type of display. The computing system 800 may also include a printer controller 812 for communicating with a printer 813. A communications controller 814 may interface with one or more communication devices 815, which enables system 800 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

The invention claimed is:

1. A computer-implemented method for training a small-footprint keyword-spotting model architecture, the method comprising:

receiving a set of audio samples that each comprises a keyword, the keywords having been aligned by using an alignment method that enables use of a cross-entropy loss function;

converting the set of audio samples into spectrograms;

inputting the spectrograms to one or more convolutional layers that apply one or more multi-dimensional filters to the spectrograms to generate a convolutional layer output;

using the convolutional layer output in at least one recurrent layer to generate a recurrent layer output;

providing the recurrent layer output to one or more fully connected layers;

performing a nonlinear function on an output of the one or more fully connected layers to obtain a probability score that corresponds to a probability that a sample in the set of audio samples comprises the keyword; and using the probability score in a cross-entropy loss function to adjust one or more model parameters of a convolutional layer.

2. The training method according to claim 1, wherein the alignment method comprises:
  providing the set of audio samples to a speech model to obtain raw connectionist temporal classification (CTC) output scores;
  modifying the raw CTC output scores to obtain estimated character occurrence probabilities in an expected order of the keyword characters;
  using the estimated character occurrence probabilities to obtain time values associated with peak estimated probabilities for start and end characters in a keyword to identify start times and end times of the keyword;
  based on at least one of a start time and an end time of keywords sequentially aligning the keywords to obtain time-aligned keywords; and
  using at least some of the time-aligned keywords as training samples to train the small-footprint keyword-spotting model architecture to identify keywords in the set of audio samples.

3. The training method according to claim 2, wherein aligning comprises cropping unwanted acoustic data from the keywords in the set of audio samples.

4. The training method according to claim 2, wherein modifying the raw CTC output scores comprises imposing the expected order of characters as a condition.

5. The training method according to claim 4, further comprising adjusting the one or more model parameters in response to a condition being met.

6. The training method according to claim 1, wherein the output scores are outputs of a large-scale speech recognition system.

7. The training method according to claim 1, further comprising using hard negative mining to improve detection performance by identifying and using unwanted samples as negative samples to further train a model.

8. The training method according to claim 7, wherein hard negative mining comprises:
  applying a data set to the model to identify frames for which the model detects false alarms; and
  using those frames as the negative samples.

9. The training method according to claim 2, wherein the estimated character occurrence probabilities at each time step are input from a speech recognition model that maps characters from acoustic signals in the audio sample.

10. The training method according to claim 2, wherein the set of audio samples is augmented by combining the set of audio samples with a set of impulse responses to construct a far-field training test set.

11. The training method according to claim 10, wherein, for a given distance, each impulse response is associated with audio signals representing a different acoustic environment.

12. The training method according to claim 2, wherein the set of audio samples is augmented by adding a mismatch signal to the set of audio samples to enhance detection performance in the presence of mismatch signals to provide robustness against alignment errors caused by noisy environments.

13. The training method according to claim 12, wherein the mismatch signals comprise at least one of a noise signal and an amount of random jitter.

14. A method for using a small-footprint keyword spotting model to detect a keyword, the method comprising:
  receiving audio data;
  inputting the audio data into a convolutional recurrent neural network (CRNN) that has been trained using cross-entropy loss to detect a target keyword in an audio sample by using a training method that comprises:
  receiving a set of audio samples that each comprises the target keyword, the target keywords having been aligned by using an alignment method that enables use of a cross-entropy loss function;
  aligning the target keywords in the audio samples to enable a use of a cross-entropy loss function;
  converting the set of audio samples into spectrograms to obtain features;
  using the features to a convolutional layer that applies one or more multi-dimensional filters to the spectrograms to generate a convolutional layer output;
  using the convolutional layer output in at least one recurrent layer to generate a recurrent layer output;
  providing the recurrent layer output to one or more fully connected layers;
  performing a nonlinear function on an output of the one or more fully connected layers to obtain a probability score that corresponds to a probability that a sample in the set of audio samples comprises the target keyword; and
  using the probability score in a cross-entropy loss function to adjust a model parameter of a convolutional layer.

15. The method according to claim 14, wherein the training method comprises adding a mismatch to the set of audio samples to enhance detection performance in the presence of the mismatch to provide robustness against one of alignment errors, noisy environments, and far-field distortion.

16. The method according to claim 14, wherein the training method comprises using hard negative mining to improve detection performance by identifying and using unwanted samples as negative samples to further train a model.

17. The method according to claim 16, wherein hard negative mining comprises:
  applying a data set to the model to identify frames for which the model detects false alarms; and using those frames as the negative samples.

18. A non-transitory computer-readable medium or media comprising one or more sequences of instructions which, when executed by one or more microprocessors, causes steps to be performed comprising:
  receiving a set of audio samples that each comprises a keyword, the keywords having been aligned by using an alignment method that enables use of a cross-entropy loss function;
  converting the set of audio samples into spectrograms;
  inputting the spectrograms to a convolutional layer that applies one or more multi-dimensional filters to the spectrograms to generate a convolutional layer output;
  using the convolutional layer output in at least one recurrent layer to generate a recurrent layer output;
  providing the recurrent layer output to one or more fully connected layers;
  performing a nonlinear function on an output of the one or more fully connected layers to obtain a probability score that corresponds to a probability that a sample in the set of audio samples comprises the keyword; and
  using the probability score in a cross-entropy loss function to adjust one or more model parameters of a convolutional layer.

19. The non-transitory computer-readable medium or media according to claim 18, wherein the alignment method comprises:
- providing the set of audio samples to a speech model to obtain raw CTC output scores;
- modifying the raw CTC output scores to obtain estimated character occurrence probabilities in an expected order of the keyword characters;
- using the estimated character occurrence probabilities to obtain time values associated with peak estimated probabilities for start and end characters in a keyword to identify start times and end times of the keyword;
- based on at least one of a start time and an end time of the keyword sequentially aligning the keyword samples to obtain time-aligned keywords; and
- using at least some of the time-aligned keywords as training samples to train the small-footprint keyword-spotting model architecture to identify keywords in the set of audio samples.

20. The non-transitory computer-readable medium or media according to claim 18, wherein the set of audio samples is augmented by at least one of a far-field test set, a noise signal, and a random jitter.

\* \* \* \* \*